United States Patent
MacLean

[11] Patent Number: 6,144,408
[45] Date of Patent: Nov. 7, 2000

[54] BLACK PATTERN CORRECTION FOR CHARGE TRANSFER SENSOR

[75] Inventor: Steven D. MacLean, Webster, N.Y.

[73] Assignee: Eastman Kodak Company, Rochester, N.Y.

[21] Appl. No.: 08/995,955

[22] Filed: Dec. 22, 1997

Related U.S. Application Data

[63] Continuation of application No. 08/394,130, Feb. 24, 1995, abandoned.

[51] Int. Cl.$^7$ ................................................. H04N 9/64
[52] U.S. Cl. .................... 348/241; 348/243; 348/245; 348/251
[58] Field of Search ................... 348/243, 245, 348/251, 271; H04N 9/64

[56] References Cited

U.S. PATENT DOCUMENTS

| | | | |
|---|---|---|---|
| 4,173,772 | 11/1979 | White | 358/213 |
| 4,484,223 | 11/1984 | Tsunekawa | 358/213 |
| 5,047,861 | 9/1991 | Houchin et al. | 348/241 |
| 5,153,732 | 10/1992 | Oda et al. | 358/213.15 |
| 5,181,118 | 1/1993 | Kimura | 358/213.16 |
| 5,272,536 | 12/1993 | Sudo et al. | 358/213.15 |
| 5,278,658 | 1/1994 | Takase | 358/213.15 |
| 5,325,412 | 6/1994 | Stekelenburg | 346/243 |
| 5,442,394 | 8/1995 | Lee | 348/264 |
| 5,493,334 | 2/1996 | Forten et al. | 348/241 |

*Primary Examiner*—Nathan Flynn
*Assistant Examiner*—Vivek Srivastavia
*Attorney, Agent, or Firm*—David M. Woods

[57] ABSTRACT

An electronic imaging device employs black pattern correction for dark current in a charge transfer image sensor. The sensor is composed of image pixels having a characteristic black pattern of dark current in which the amplitude of the dark current for each pixel is dependent upon exposure time. A reference dark frame exposure is captured from the image sensor in the absence of light and dark frame pixel values are obtained. An exposure section regulates the exposure time of image light upon the image sensor and provides a corresponding plurality of image frame exposures; the image sensor thus generates a corresponding plurality of image frames each comprised of image frame pixel values. A processor then generates a correction factor from the dark frame pixel values and applies the correction factor to the image frame pixel values for the plurality of image frames to obtain corrected image frame pixel values that are modified for the black pattern. As a result, performance efficiency is increased by using a single reference dark frame exposure in the correction of many image frame exposures.

15 Claims, 5 Drawing Sheets

BLACK PATTERN CORRECTION FOR CHARGE TRANSFER SENSOR

This application is a continuation of application Ser. No. 08/394,130 filed on Feb. 24, 1995.

FIELD OF THE INVENTION

The invention relates generally to the field of charge transfer sensors, and in particular to pattern correction for a charge coupled device (CCD) sensor.

BACKGROUND OF THE INVENTION

Figure 1:
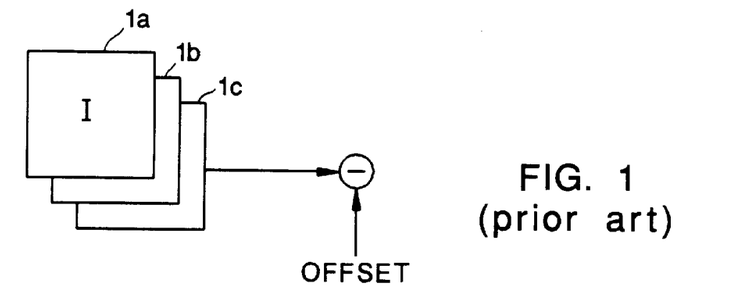
FIG. 1 is a pictorial diagram of a known way to correct for the average dark current in an image sensor.

Black pattern has been a characteristic problem for charge transfer sensors, and especially for CCD image sensors. Since a CCD operates by controlling a spatially defined array of depletion regions (potential wells), minority carriers continually generated due to thermal vibration of the silicon lattice tend to flow to the point of minimum potential where they are collected. Such thermally generated carriers are evidenced by what is known as black or dark current in the output of the sensor. In a conventional CCD sensor, a light protected area on the sensor (outside the image area) provides an estimate, called an offset, of the average dark current produced by the sensor. As shown in FIG. 1, this offset is subtracted from each image 1a, 1b, and 1c.

The dark current, however, is non-uniform throughout the sensor device, and imposes a fixed-pattern noise on the signal. This problem causes the image data from the CCD sensor to have a corresponding noise pattern. Importantly, the spatial pattern is stationary as to the device, although the amplitude at any particular location is dependent upon temperature, exposure time, and location in the array. Consequently, each pattern of amplitudes is unique to a device, as well to the temperature and the exposure time.

When linear CCD sensors require a black pattern correction, the correction is generally performed by storing a representative line of data captured in the dark. This line of data, which represents the residual black or dark current, is then subtracted from each line of data representing image information. The result of the subtraction is an image line free of the black pattern noise. This correction, however, assumes the pattern in the dark line remains the same as the dark current in the image line. Therefore, the dark line must be updated regularly to accommodate changes in temperature and exposure time.

Figure 2:
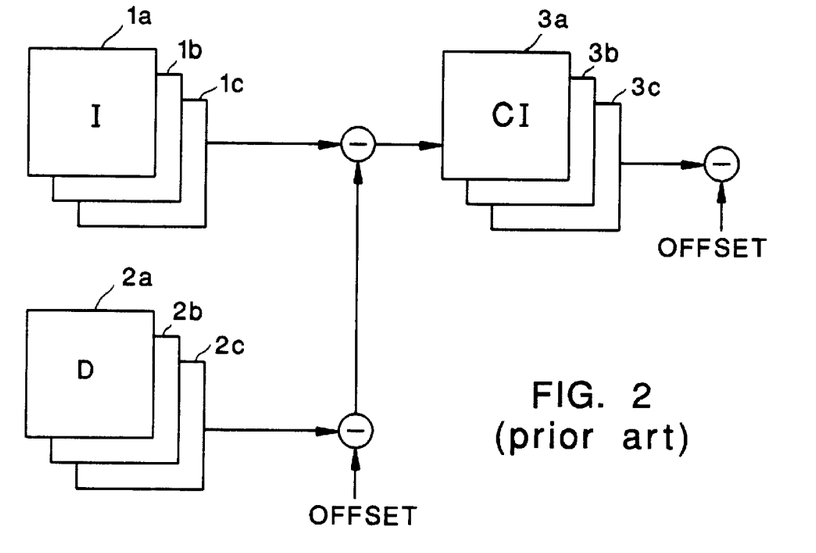
FIG. 2 is a pictorial diagram of a known way to correct for the black pattern in an image sensor.

Area CCD image sensor arrays often require a black pattern correction also. For area arrays, an array of lines is captured as a frame of data, and the dark current accordingly has a two-dimensional black pattern. To correct for such a black pattern, as shown in FIG. 2, it is known to capture a dark frame 2a representing an array of lines exposed in darkness, and then to subtract that dark frame from a contemporaneously-captured image frame 1a to obtain a corrected image frame 3a. Since the amount of dark current is a function of temperature and the length of exposure, the dark frame values must be updated regularly to accommodate changes in temperature and exposure time. This conventionally means, as shown in FIG. 2, that a unique dark frame 2a, 2b, or 2c is captured for each image frame 1a, 1b, or 1c. In addition, an average offset is still calculated from the light-protected area of the sensor for each dark and image frame, and subtracted as shown in FIG. 2 from the dark frames 2a, 2b, and 2c and the corrected image frames 3a, 3b, and 3c.

A problem arises because of the processing requirements for the dark frame updates necessary for black pattern correction. There are basically two known ways of handling these updates. For many imaging systems the exposure time changes regularly due to light variations. One solution, therefore, is to store dark frame values for all possible exposure times. However, since each frame can require megabytes of storage, such large amounts of storage are not always available. Moreover, the cost of memory sometimes precludes the dedication of so much memory to one correction.

The alternative is to acquire a new dark frame each time the exposure time changes. This methodology substantially affects system performance. Essentially every image frame acquisition requires an additional dark frame acquisition. This effectively doubles the amount of time required to perform a scan of the image sensor, which becomes especially prohibitive for long exposures.

SUMMARY OF THE INVENTION

The present invention is directed to overcoming one or more of the problems set forth above. Briefly summarized, according to one aspect of the present invention, an electronic imaging device employing black pattern correction for dark current in an image sensor includes: a charge transfer image sensor composed of image pixels having a characteristic black pattern of dark current corresponding to the array of pixels in the sensor, the amplitude of the dark current for each pixel being dependent upon exposure time; means for capturing a reference dark frame exposure from the image sensor in the absence of light and generating dark frame pixel values therefrom; an exposure section for regulating the exposure time of image light upon the image sensor and providing a corresponding plurality of image frame exposures, the image sensor generating a corresponding plurality of image frames each comprised of image frame pixel values; and a processor section for generating a correction factor from the dark frame pixel values and for applying the correction factor to the image frame pixel values for the plurality of image frames to obtain corrected image frame pixel values that are modified for the black pattern due to dark current in the image sensor, wherein a single reference dark frame exposure is used in the correction of many image frame exposures.

ADVANTAGEOUS EFFECT OF THE INVENTION

The main advantage of this invention is that the capture and use of a single dark frame for a plurality of image frame exposures leads to greater performance efficiency. Rather than generating a unique dark frame for each image exposure, which may double the overall exposure time, the use and reuse of a single scaled dark frame exposure can significantly reduce overall exposure time. In addition, the need for storage of only one dark frame can significantly reduce storage requirements.

These and other aspects, objects, features and advantages of the present invention will be more clearly understood and appreciated from a review of the following detailed description of the preferred embodiments and appended claims, and by reference to the accompanying drawings.

BRIEF DESCRIPTION OF THE DRAWINGS

The prior art and the invention will be described in relation to the drawings, in which.

DETAILED DESCRIPTION OF THE INVENTION

Figure 3:
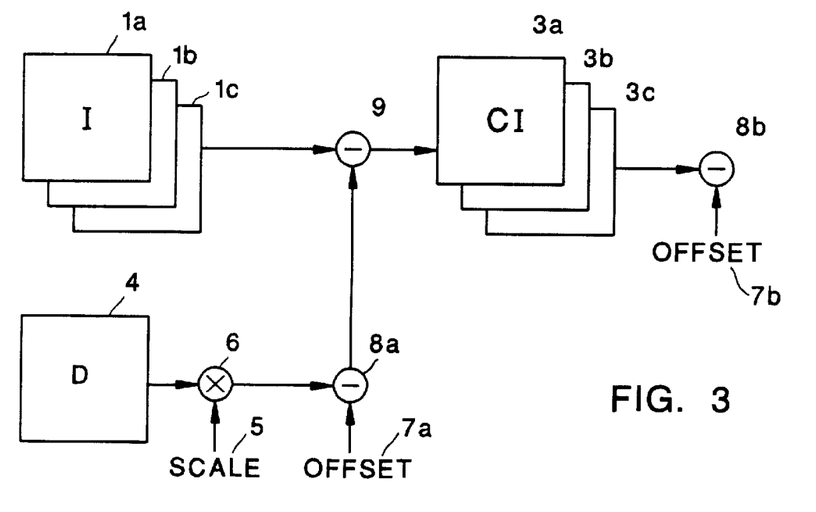
FIG. 3 is a pictorial diagram of black pattern correction in an image sensor according to the invention.

Referring now to FIG. 3, black pattern correction according to the invention involves the capture and storage of a reference dark frame 4, also referred to hereinafter as a black_frame, from an exposure of predetermined duration. A scaling factor 5 is calculated for each image frame 1a, 1b, and 1c, which are also referred to hereinafter as system_images, and then applied to the dark frame 4 in a scaling multiplier 6. A scaled offset 7a is also calculated and removed from the dark frame 4 in a subtractor 8a. The effect of the scaled offset is to provide an average signal reduction that is symmetrical to the conventional offsets provided to the dark frames 2a, 2b, and 2c in FIG. 2. As each image frame 1a, 1b, and 1c is captured, the scaled and offset version of the dark frame 4 is subtracted from each image frame 1a, 1b, and 1c in a subtractor 9. The result is a series of corrected image frames 3a, 3b, and 3c, which are then offset in the manner shown in FIGS. 1 and 2 by subtraction of an average dark current offset value 7b (obtained from the light protected area of the sensor during capture of the images 1a, 1b, and 1c) in a subtractor 8b.

Figure 4:
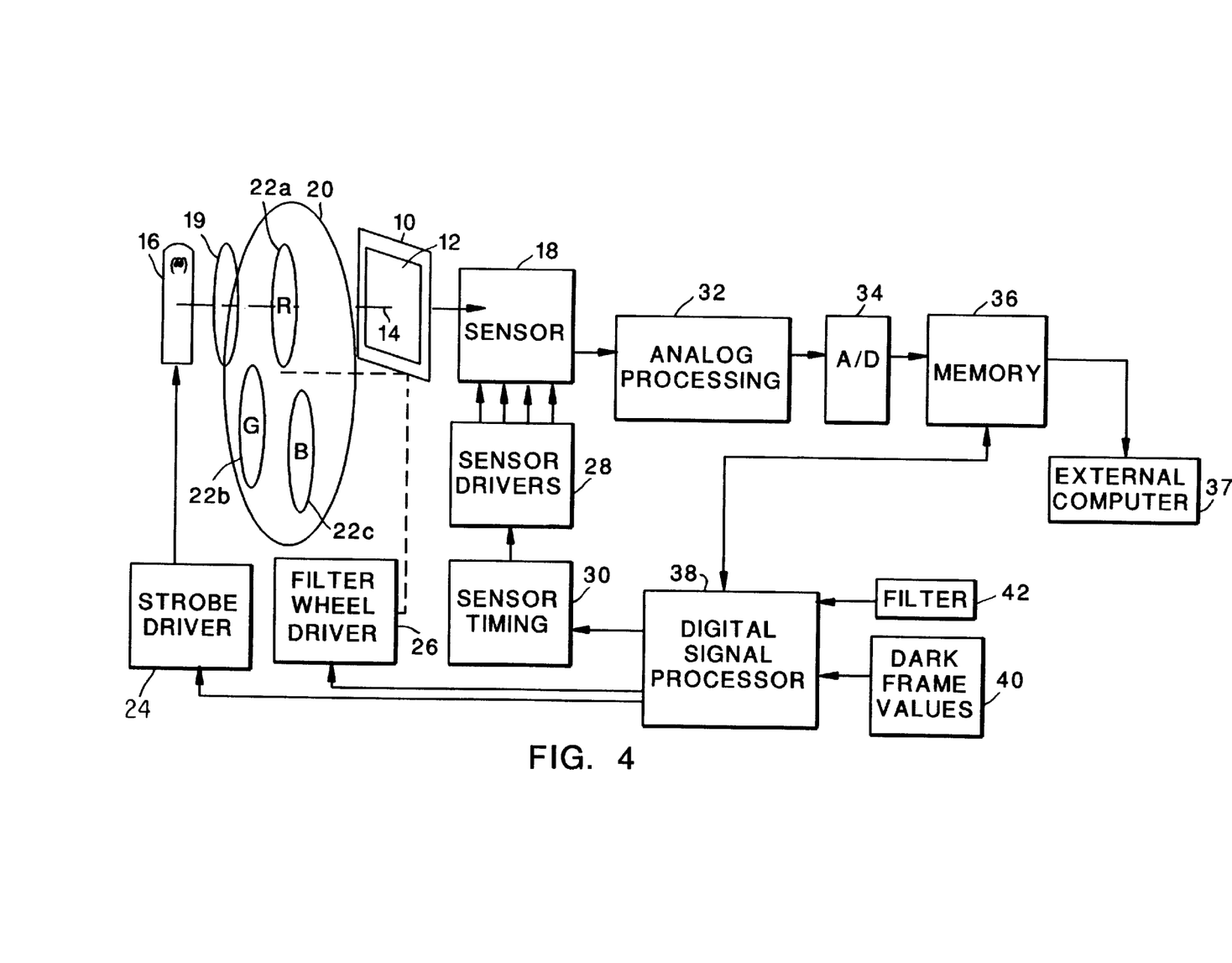
FIG. 4 is a block diagram of an electronic imaging device employing black pattern correction according to the invention.

A block diagram of an imaging device employing black pattern correction according to the invention is shown in FIG. 4. The imaging device includes a gate 10 for supporting a transparency 12 in an optical path 14 between a strobe light source 16 and an image sensor 18. A lens assembly 19 and a rotatable color filter wheel 20, including red, green, and blue color filters 22a, 22b, and 22c, are also positioned in the optical path 14. The foregoing components are enclosed in a light-tight enclosure (not shown) such that the length of the exposure is regulated by the length of time that the strobe 16 is energized to produce light. Exposure time, i.e., activation time of the strobe 16, is controlled by a strobe driver 24, which is connected to the strobe light source 16. A color image is captured sequentially in separate red, green, and blue records by rotating the color filter wheel 20 to sequentially place the red, green, and blue color filters 22a, 22b, and 22c in the optical path 14. The sequence of capture is controlled by a filter wheel driver 26, which is connected to the color filter wheel 20.

The image sensor 18 is a full frame area array charge transfer sensor, in particular a charge coupled device (CCD) sensor. Phase clocks for charge transfer from the CCD image sensor 18 are provided by a sensor driver circuit 28, which is controlled by a sensor timing circuit 30. The image signal produced by the image sensor 18 is amplified and processed by an analog processing circuit 32, which performs conventional correlated double sampling of the image signal. The analog image signal is then converted to digital form in an A/D converter 34. The digitized image signal is stored in a digital memory 36, which may be a DRAM or like form of memory. The digitized image signal is then available for transmission to an external utilization device, such as a computer 37.

A digital signal processor 38 is connected to the strobe driver 24, the filter wheel driver 26, and the sensor timing circuit 30 for respectively controlling the length of image exposure, the sequence of color image capture, and the initiation of sensor clocking signals from the sensor drivers 28. The sensor clocking signals transfer an image signal in the conventional manner from the image sensor 18 to the analog processing circuit 32. The length of exposure is based in part on the calibration of the strobe light source 16 and the color filters 22a, 22b, and 22c, which is dependent upon aging of the light source and filters. The exposure time also changes for each color and type of film being used. The digital signal processor 38 is also connected to the digital memory 36 in order to access the stored digital image values for processing purposes. A frame store 40 is connected to the digital signal processor 38 for storing dark current values for each image pixel for the dark frame 4 (see FIG. 3), resulting from an image capture using a predetermined exposure without energizing the strobe 16. The totality of these dark current values are referred to as the black_image, and represent the_black pattern noise in the image sensor 18 for the particular exposure time employed. A filter memory 42 is also connected to the digital signal processor 38 for storing the code used in calculating the scale factor 5 and the offset 7a (see FIG. 3) that are applied to the dark current values stored in the frame store 40, and to the image frame pixel values resulting from a particular exposure to image light.

Figure 5:
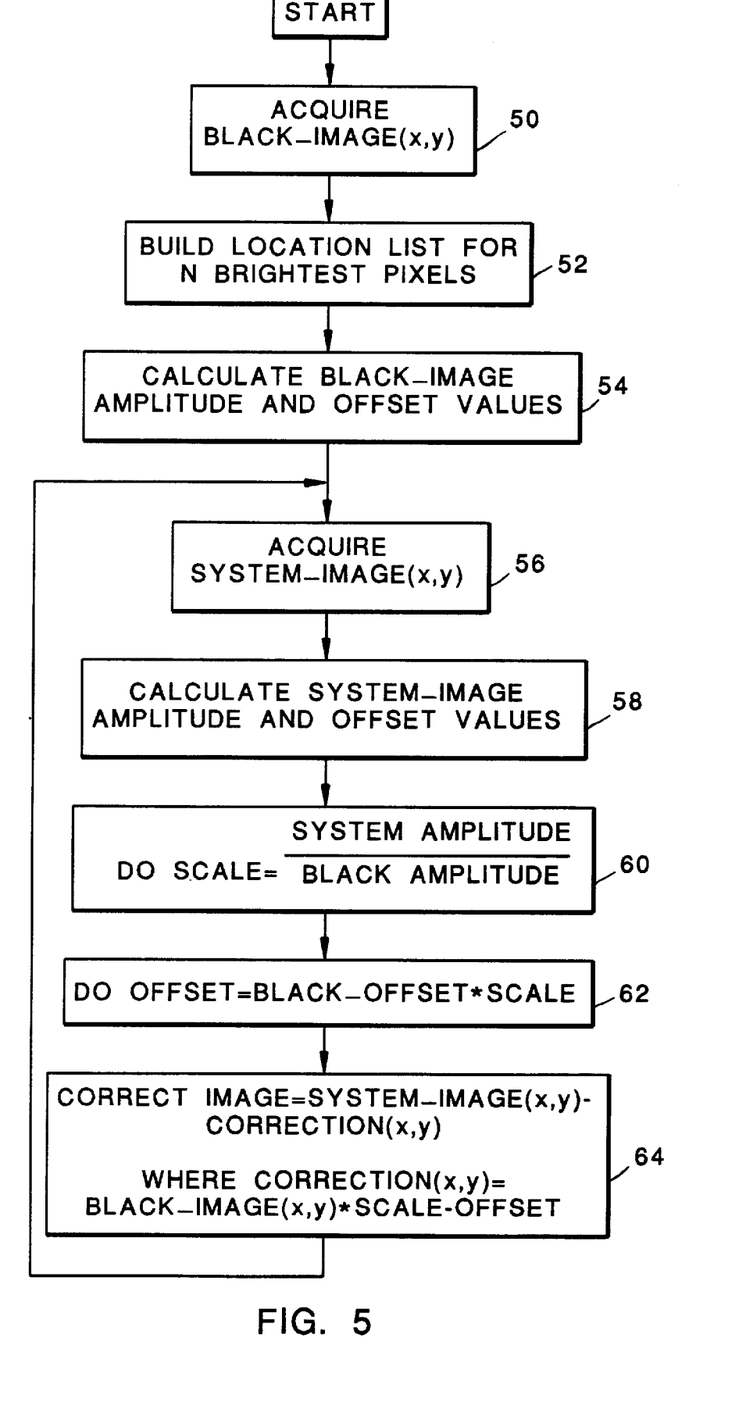
FIG. 5 is a flow chart diagram of the overall system flow of black pattern correction according to the invention.
Figure 6:
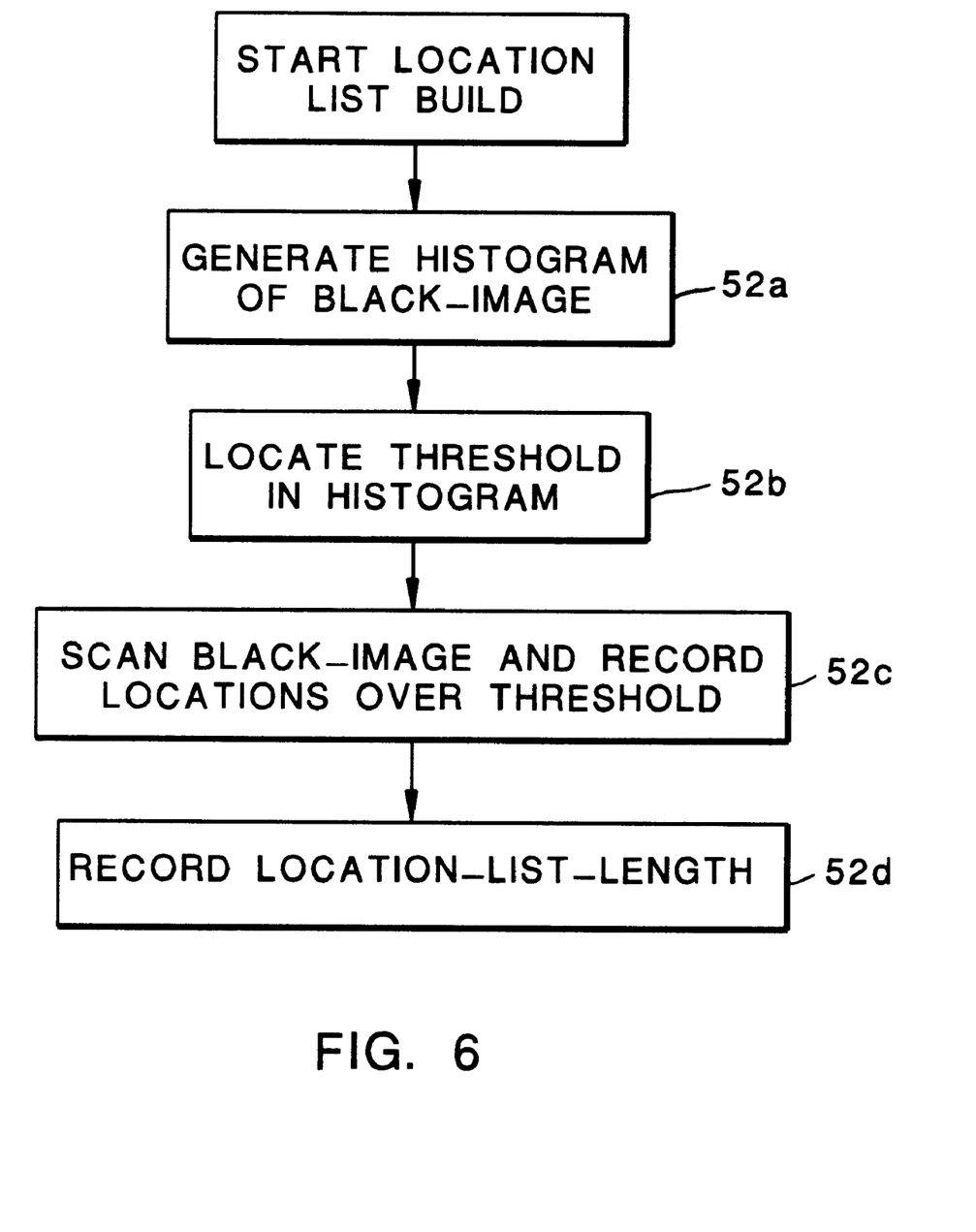
FIG. 6 is a flow chart diagram expanding on a portion of the overall system flow shown in FIG. 5.
Figure 7:
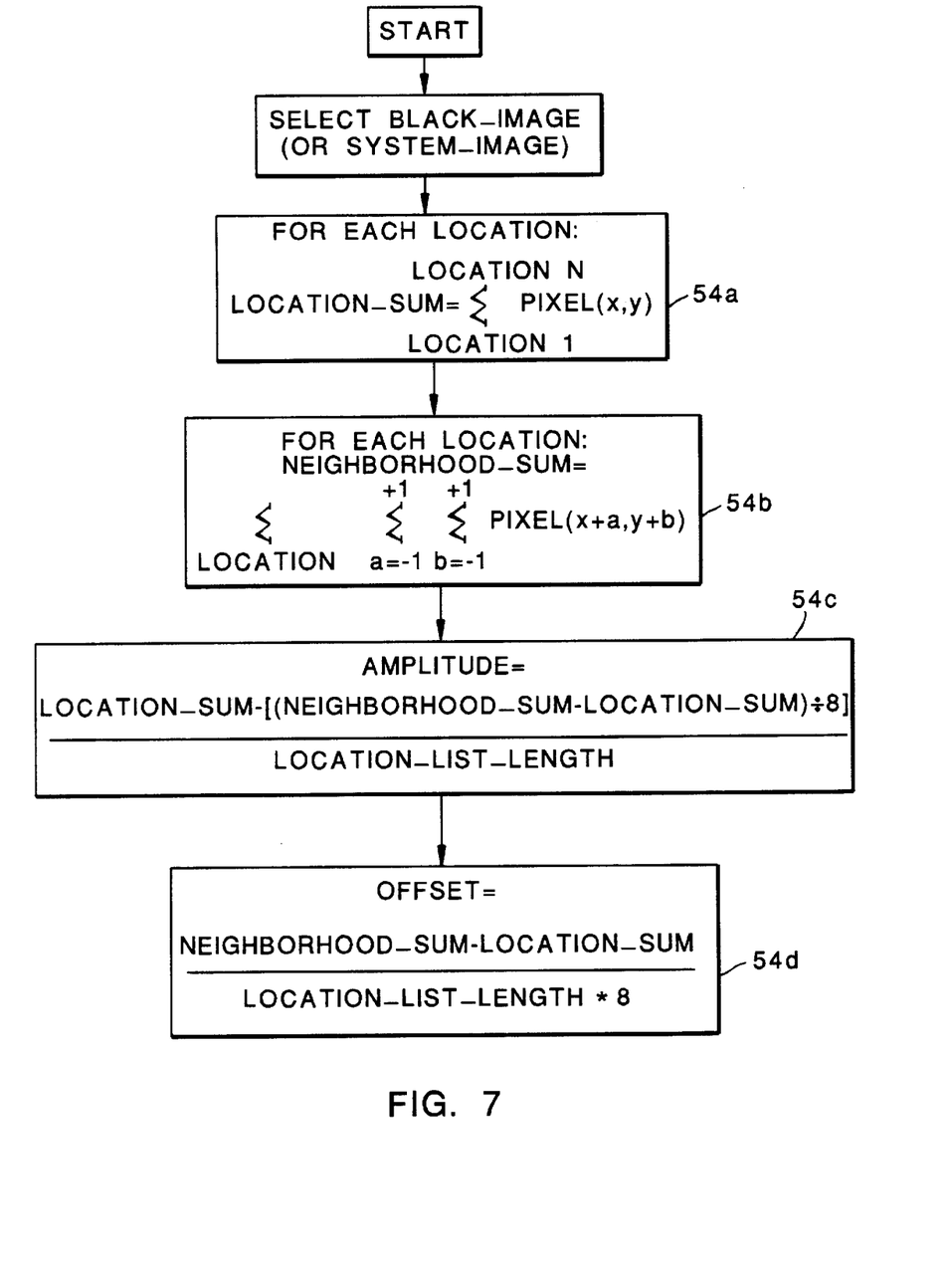
FIG. 7 is a flow chart diagram expanding on a further portion of the overall system flow shown in FIG. 5.

The digital signal processor 38 implements the black pattern correction shown pictorially in FIG. 3, and in more detail in the flow charts in FIGS. 5, 6, and 7. In the beginning, as shown by block 50 in FIG. 5, a dark frame (black_image) is captured and stored for all (x,y) pixel locations on the image sensor 18. This dark image is captured using a relatively long exposure compared to the usual image frame (system_image) exposures. The length, however, is not critical and may be in the midrange of the exposures normally used by the imaging device. The next step is to analyze the black_image by building a list of the location (location_list) of the brightest pixel points in the dark frame. This is shown by block 52 in FIG. 5, and in more detail in FIG. 6. Initially, a histogram of all the points in the black_image is generated, as shown in block 52a in FIG. 6. Then a threshold is established in the histogram such that a predetermined number (n) of occurrences on the histogram are above the threshold (block 52b). With the threshold established, all pixel locations of the black_image are scanned and the (x,y) locations of all pixels over the threshold are recorded, as shown in block 52c. Moreover, the number of such locations is saved as the location_list_length (block 52d).

Referring back to FIG. 5, amplitude and offset values are next calculated in respective blocks 54 and 58 for the black_image and for the system_image, as shown in further detail in FIG. 7. The amplitude sum (location_sum) of the pixel amplitudes for all (x,y) locations where the black_image pixels exceeded the threshold is calculated in block 54a. This sum consequently comprises all the bright pixel amplitudes. Next, the area sum (neighborhood_sum) of the pixel amplitudes for all (x,y) locations where the black_image pixels exceeded the threshold and the pixel amplitudes of the eight pixels surrounding these (x,y) locations are calculated in block 54b. This sum consequently comprises all neighborhoods of all bright pixels. Thereafter, a smoothed amplitude value representative of an average bright pixel is calculated in the block 54c. Finally, with reference to FIG. 7, an offset is calculated for the black__image in block 54d. The purpose of this calculated offset is to provide an average dark current subtraction attributable to the black__image that is symmetrical with the offset 7b provided for each system__image 1a, 1b, and 1c (see FIG. 3).

Referring to FIG. 5, the scale factor is then calculated in block 60 by dividing the amplitude for the system__image by the amplitude for the black__image, and the offset is calculated in block 62 by multiplying the offset for the black__image by the scale factor. These factors are then applied as shown in FIG. 3 to all of the dark frame values by the multiplier 6 and the subtractor 8a to provide the correction (x,y) array seen in block 64. This (x,y) array of corrections is then subtracted in block 64 from the system__image pixel by pixel to form the corrected image. This is also seen by the subtractor 9 in the pictorial diagram shown in FIG. 3.

The generation of the scale factor is based on the use of a Laplacian operator at each (x,y) location greater than the threshold. Basically the output from the Laplacian operator is summed, and the sum is collected for both the dark frame and the image frame. The scale factor is then the "image sum" divided by the "dark sum". This concept allows measurement of the dark pattern within an image. The Laplacian operator tends to isolate image variation. This depends on the fact that the pattern is primarily high frequency in nature. The location information also does a good job of isolating image information. The dark pattern tends to be random and widely distributed. This makes it unlikely that any real image would have the same pattern.

The impact of the invention on processing time has been found to be substantial. Tests were conducted utilizing processes that would be equivalent to the processing provided by the digital signal processor 38. In particular, processing was conducted for 35 mm scanned at several DPI (dots per inch) resolution for the "before" condition (without any correction) and the "after" condition, using the scaled black pattern correction. As assumed, if black pattern correction wee applied as in the prior art to the "before" conditions, this would have doubled the times, e.g., an 11 second exposure for 1000 DPI would be 22 seconds.

The following table describes data gathered on a Macintosh Quadra 900, Photoshop Version 2.5, and 50 MB of memory allocated. The before column represents no correction. The after column represents software modified to do dark pattern correction.

|  | Before | After |
|---|---|---|
| 200 DPI Scan | 7 seconds | 8 seconds |
| 500 DPI Scan | 8 seconds | 8 seconds |
| 1000 DPI Scan | 11 seconds | 15 seconds |
| 2000 DPI Scan | 40 seconds | 58 seconds |

The following table describes data gathered on a Macintosh IIx, Photoshop Version 2.01, and 6 MB of memory allocated. The before column represents no correction. The after column represents software modified to do dark pattern correction.

|  | Before | After |
|---|---|---|
| 200 DPI Scan | 6 seconds | 6 seconds |
| 500 DPI Scan | 9 seconds | 9 seconds |
| 1000 DPI Scan | 16 seconds | 21 seconds |
| 2000 DPI Scan | 79 seconds | 102 seconds |

In terms of operation of the electronic imaging device shown in FIG. 4, a single dark frame 4 is captured upon power up of the imaging device. This might be done whenever the device is set up for scanning a particular batch of film, say once a day or the like. The building of the location list (FIG. 6) and the calculation of the amplitude and offset values (FIG. 7) for the dark frame 4 is therefore only done once for a particular scanning session. Consequently, the (x,y) locations of the bright pixels, the total number of bright pixels (location__list__length), the location__sum, the neighborhood__sum, the amplitude, and the offset for the dark frame are calculated once per session and saved in the frame store 40. Thereafter, as each image frame 1a, 1b, and 1c (system__image) is captured, the amplitude for each image frame is calculated and combined with the saved amplitude value for the dark frame to provide a unique scale factor each image frame. This unique scale factor and the dark frame offset are then applied to each dark frame pixel value to generate an array of correction values that are applied to the corresponding image pixel values.

The invention has been described with reference to a preferred embodiment. However, it will be appreciated that variations and modifications can be effected by a person of ordinary skill in the art without departing from the scope of the invention.

| PARTS LIST | |
|---|---|
| 1a, 1b, 1c | image frames (system__images) |
| 2a, 2b, 2c | dark frames |
| 3a, 3b, 3c | corrected image frames |
| 4 | reference dark frame (black__frame) |
| 5 | scaling factor |
| 6 | scaling multiplier |
| 7a | scaled offset |
| 7b | average dark current offset value |
| 8a | subtractor |
| 8b | subtractor |
| 9 | subtractor |
| 10 | gate |
| 12 | transparency |
| 14 | optical path |
| 16 | strobe light source |
| 18 | image sensor |
| 19 | lens assembly |
| 20 | rotatable color filter wheel |
| 22a | red color filter |
| 22b | green color filter |
| 22c | blue color filter |
| 24 | strobe driver |
| 26 | filter wheel driver |
| 28 | sensor driver circuit |
| 30 | sensor timing circuit |
| 32 | analog processing circuit |
| 34 | A/D converter |
| 36 | digital memory |
| 37 | computer |
| 38 | digital signal processor |
| 40 | frame store |
| 42 | filter memory |
| 50 | block |
| 52a, 52b, 52c, 52d | block |

| -continued | |
|---|---|
| PARTS LIST | |
| 54a, 54b, 54c, 54d | block |
| 60 | block |

What is claimed is:

1. A electronic imaging device employing black pattern correction for dark current in an image sensor, said dark current imposing a fixed-pattern noise on image signals obtained by exposing the image sensor to image light from a subject, said imaging device comprising:

a charge transfer image sensor composed of image pixels having a characteristic black pattern of dark current corresponding to the array of pixels in the sensor, the amplitude of the dark current for each pixel being dependent upon exposure time;

means for capturing a reference dark frame exposure from the image sensor in the absence of light and generating dark frame pixel values therefrom;

an exposure section for regulating the exposure time of the image light upon the image sensor and providing a corresponding plurality of image frame exposures in the presence of the image light, which is non-uniform across the sensor, the image sensor generating a corresponding plurality of image frames each comprised of image frame pixel values representative of the non-uniform image light; and a processor section for generating a unique black pattern dark current correction factor for each image frame based on processing both the dark frame pixel values for the reference dark frame exposure and the image frame pixel values for each image frame exposure, said processor section applying each black pattern correction factor to the image frame pixel values for each of the plurality of image frames to obtain corrected image frame pixel values that are modified for the black pattern due to dark current in the image sensor, wherein a single reference dark frame exposure is used in the correction of many image frame exposures.

2. An electronic imaging device as claimed in claim 1 wherein the correction factor is used to generate a pattern-corrected version of the image frame pixel values.

3. An electronic imaging device as claimed in claim 2 wherein the correction factor is used to scale the dark frame pixel values and the processor section subtracts the scaled version of the dark frame pixel values from the image pixel values to obtain the pattern-corrected version of the image frame pixel values.

4. An electronic imaging device as claimed in claim 1 wherein the correction factor is used to calculate a single scale factor that is used to correct all the image frame pixel values for an image frame exposure.

5. An electronic imaging device as claimed in claim 1 wherein the correction factor is based on a Laplacian operation.

6. An electronic imaging device employing black pattern correction for dark current in an image sensor, said dark current imposing a fixed-pattern noise on image signals obtained by exposing the image sensor to image light from a subject, said imaging device comprising:

a charge transfer image sensor composed of image pixels having a characteristic black pattern of dark current corresponding to the array of pixels in the sensor, the amplitude of the dark current for each pixel being dependent upon exposure time;

means for capturing a reference dark frame exposure from the image sensor in the absence of light and generating dark frame pixel values therefrom;

a memory section for storing the dark frame pixel values corresponding to the dark current amplitude for each pixel from the reference dark frame;

an exposure section for regulating the exposure time of the image light upon the image sensor and providing a corresponding plurality of image frame exposures in the presence of the image light, which is non-uniform across the sensor, the image sensor generating a corresponding plurality of image frames each comprised of image frame pixel values representative of the non-uniform image light; and a processor section for generating a unique black pattern dark current scaling factor for each image frame from an arithmetic operation on both the dark frame pixel values stored in the memory section and the image frame pixel values generated by the image sensor for each image frame, the operation generating scaled dark frame image values that are subtracted from the image frame pixel values for each image frame to obtain corrected image frame pixel values that are modified for the black pattern due to dark current in the image sensor, wherein a single reference dark frame exposure is used in the correction of many image frame exposures.

7. An electronic imaging device as claimed in claim 6 wherein the operation performed by the processor section calculates a single scale factor that is used to correct all the image frame pixel values for an image frame exposure.

8. An electronic imaging device as claimed in claim 6 wherein the operation performed by the processor section is based on a Laplacian operation.

9. A method of black pattern correction for an image sensor in order to remove the effect of dark current pattern noise from an array of image pixels, said dark current pattern noise imposed on image signals obtained by exposing the image sensor to image light from a subject, said method comprising the steps of:

exposing the sensor in the absence of light for a reference exposure time in order to capture a dark frame exposure and generate dark frame image pixels;

exposing the sensor in the presence of the image light for a variable exposure time in order to capture a plurality of image frame exposures in the presence of the image light, which is non-uniform across the sensor, and to generate a plurality of frames of image frame pixel values therefrom representative of the non-uniform image light;

generating a unique black pattern dark current correction factor for each image frame based on processing both the dark frame pixel values from the dark frame exposure and the image frame pixel values for each image frame exposure; and applying the correction factor to the image frame pixel values from the plurality of frames to obtain corrected image frame pixel values that are modified for the black pattern due to dark current in the image sensor.

10. A method of black pattern correction for an image sensor in order to remove the effect of dark current pattern noise from an array of image pixels, said dark current pattern noise imposed on image signals obtained by exposing the image sensor to image light from a subject, said method comprising the steps of:

exposing the sensor in the absence of light for a reference exposure time in order to capture a dark frame exposure;

saving dark frame pixel values from the dark frame exposure;

exposing the sensor in the presence of the image light for a selected exposure time in order to capture an image frame exposure in the presence of the image light, which is non-uniform across the sensor, and generate image frame pixel values therefrom representative of the non-uniform image light;

generating a unique black pattern dark current scale factor for each image frame exposure by an arithmetic operation on both the dark frame pixel values and the image frame pixel values;

modifying the dark frame pixel values with the scale factor to generate scaled dark frame pixel values unique for each image frame exposure; and applying the scaled dark frame pixel values to the image frame pixel values to remove the dark current pattern noise.

11. An electronic imaging device employing black pattern correction for dark current in an image sensor, said dark current imposing a fixed-pattern noise on image signals obtained by exposing the image sensor to image light from a subject, said imaging device comprising:

a charge transfer image sensor composed of image pixels having a characteristic black pattern of dark current corresponding to the array of pixels in the sensor, the amplitude of the dark current for each pixel being dependent upon exposure time;

means for capturing a reference dark frame exposure from the image sensor in the absence of light and generating dark frame pixel values therefrom;

an exposure section for regulating the exposure time of the image light upon the image sensor and providing an image frame exposure in the presence of the image light, which is non-uniform across the sensor, the image sensor generating an image frame comprised of image frame pixel values representative of the non-uniform image light; and a processor section for generating a unique black pattern dark current correction factor for the image frame based on processing both the dark frame pixel values for the reference dark frame exposure and the image frame pixel values for the image frame exposure, said processor section applying the black pattern correction factor to the image frame pixel values for the image frame to obtain corrected image frame pixel values that are modified for the black pattern due to dark current in the image sensor.

12. An electronic imaging device as claimed in claim 11 wherein the correction factor is used to generate a pattern-corrected version of the image frame pixel values.

13. An electronic imaging device as claimed in claim 12 wherein the correction factor is used to scale the dark frame pixel values and the processor section subtracts the scaled version of the dark frame pixel values from the image pixel values to obtain the pattern-corrected version of the image frame pixel values.

14. An electronic imaging device as claimed in claim 11 wherein the correction factor is used to calculate a single scale factor that is used to correct all the image frame pixel values for the image frame exposure.

15. An electronic imaging device as claimed in claim 11 wherein the correction factor is based on a Laplacian operation.

* * * * *